United States Patent [19]

Cooper

[11] 3,804,987

[45] Apr. 16, 1974

[54] MULTIPLEXING APPARATUS HAVING INTERLACED AND/OR PARALLEL DATA TRANSFER WITH A DATA PROCESSOR AND COMMUNICATION LINES

[75] Inventor: Stuart B. Cooper, Framingham, Mass.

[73] Assignee: Honeywell Information Systems Inc., Waltham, Mass.

[22] Filed: Mar. 13, 1972

[21] Appl. No.: 234,175

[52] U.S. Cl. ............ 179/15 A, 178/50, 179/15 BA

[51] Int. Cl. ............................................ H01j 3/00

[58] Field of Search......... 179/15 BA, 15 BU, 15 A; 178/50; 340/172.5

[56] References Cited

UNITED STATES PATENTS

| | | | |
|---|---|---|---|
| 3,366,737 | 1/1968 | Brown | 179/15 BA |
| 3,599,160 | 8/1971 | Nestle | 179/15 BU |
| 3,466,397 | 9/1969 | Benowitz | 179/15 BA |
| 3,311,886 | 3/1967 | Herman | 179/15 BA |
| 3,300,763 | 1/1967 | Hoehmann | 179/15 BA |
| 3,238,298 | 3/1966 | Willis | 179/15 BA |
| 3,229,259 | 1/1966 | Barker | 179/15 BA |

*Primary Examiner*—Kathleen H. Claffy
*Assistant Examiner*—David L. Stewart
*Attorney, Agent, or Firm*—John S. Solakian; Ronald T. Reiling

[57] ABSTRACT

Multiplexing apparatus which includes a memory system coupled for transfer of information with a data processor and a plurality of communication lines. The memory system may include a main memory and an input/output memory coupled for transfer of information with a data processor and the communication lines respectively and with each other. The apparatus is configured to make maximum utilization of all time available and includes timing and control logic so that at all times there is transfer of information between the following coupled elements namely either (a) the main memory and processor are coupled, and the main memory and input/output memory are coupled; or (b) the main memory and processor are coupled, and the input/output memory and the plurality of communication lines are coupled; or (c) the main memory and input/output memory are coupled.

13 Claims, 6 Drawing Figures

MULTIPLEXING APPARATUS HAVING INTERLACED AND/OR PARALLEL DATA TRANSFER WITH A DATA PROCESSOR AND COMMUNICATION LINES

BACKGROUND OF THE INVENTION

The present invention relates generally to communications apparatus and more particularly to communication line multiplexing apparatus.

In a communication environment, a data processing unit is usually coupled with a plurality of communication lines in order to transmit and receive messages between various points. This condition necessitates a multiplexing arrangement with the communication lines such that the information being received and transmitted is continuously provided. The situation is aggravated when the information is being transmitted at different rates over different ones of the communication lines. The bits of information received for each character for each of the communication lines must be assembled into characters and then forwarded to the processor, and characters received for transmission must be disassembled a bit at a time, and transmitted over the communication lines. The rate imposed on this assembling process is usually dictated by the highest transmission rate of any one of the communication lines. Further, if the bits are received in asynchronous form, then sampling of bits at their midpoint must be achieved so that the proper information content thereof will be indicated. Since all of these operations must be done on an interlaced basis, that is transfer with the communication lines and transfer with the data processing unit, the problem is aggravated as these various factors are considered for implementation.

It is accordingly an object of the invention to provide an improved communication line multiplexing apparatus.

It is another object of the invention to separate the function of transfer of information with the communication lines and transfer of information with a data processing unit.

It is yet a further object to provide multiplexing apparatus which may operate with communication lines having different transmission rates.

It is a further object of the invention to provide multiplexing apparatus which includes simplified means for transfering information with the communication lines and with a data processing unit on an interlaced and/or parallel timing arrangement.

SUMMARY OF THE INVENTION

Multiplexing apparatus is provided which includes means for storing bits of information; first means for coupling said storage means for parallel transfer of some of said bits with a data processor; second means for coupling said storage means for serial transfer of said bits with a plurality of communication lines; said storage means comprising: first means for assembling said bits in series, second means for assembling groups of said bits, and control means responsive to an interrupt signal, said control means comprising means for disabling said first and second means for assemblying in order to inhibit further assembly of said bits, means for enabling said second means for coupling in order to serially transfer the previously assembled ones of said bits, and means for enabling said first means for coupling in order to transfer in parallel the previously assembled groups of said bits. The control means may further comprise means for enabling said first and second means for assembling during the time dedicated for such assembling and in addition during the time dedicated for said parallel transfer when said processor is non-responsive to said first means for coupling.

BRIEF DESCRIPTION OF THE DRAWINGS

The advantages of the foregoing configuration of this invention will become more apparent upon reading the accompanying detailed description in connection with the figures in which.

DETAILED DESCRIPTION OF THE PREFERRED EMBODIMENTS

Figure 1A:
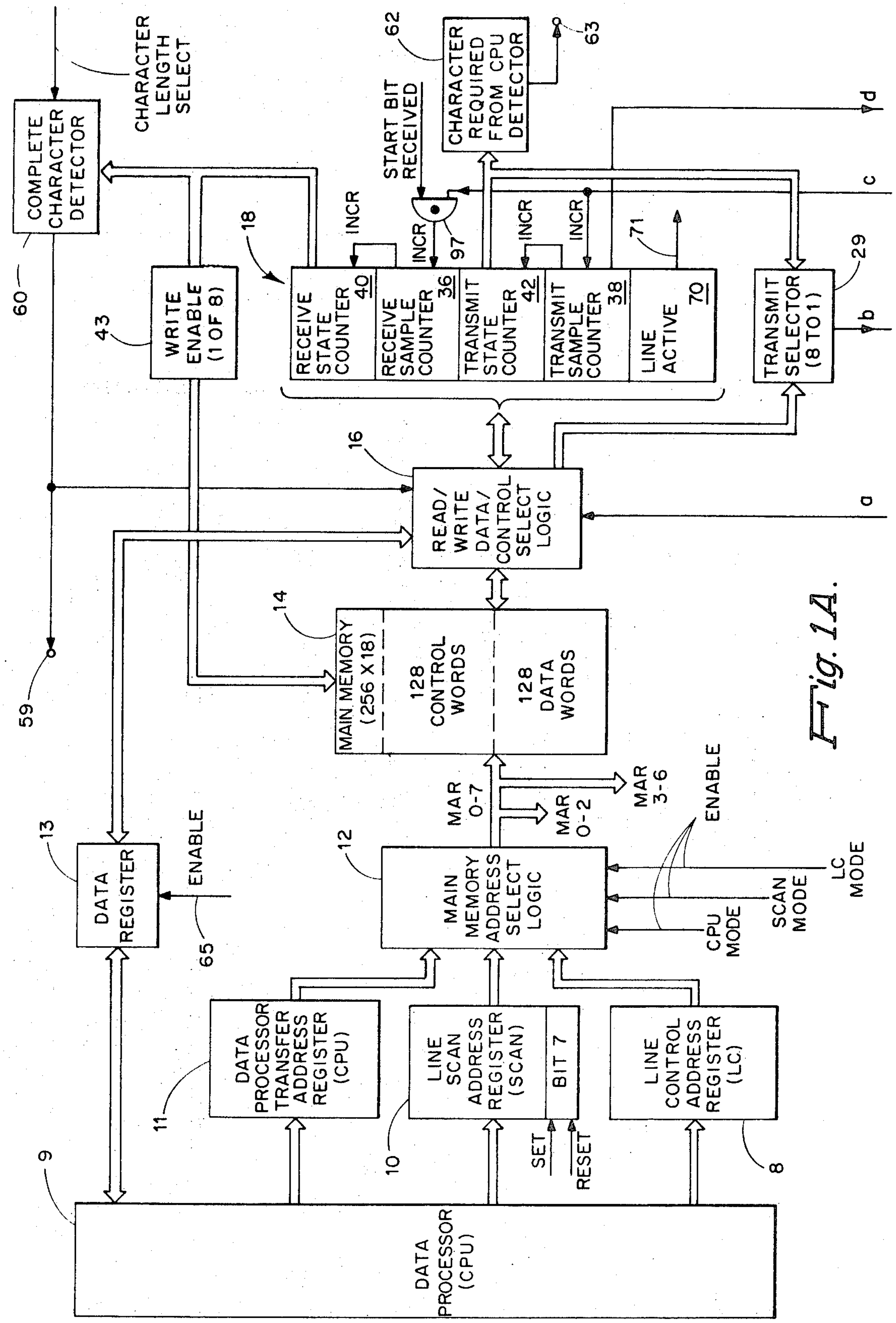
FIGS. 1A and 1B are together a general block diagram showing a preferred embodiment of the multiplexing apparatus in accordance with the principles of this invention.
Figure 1B:
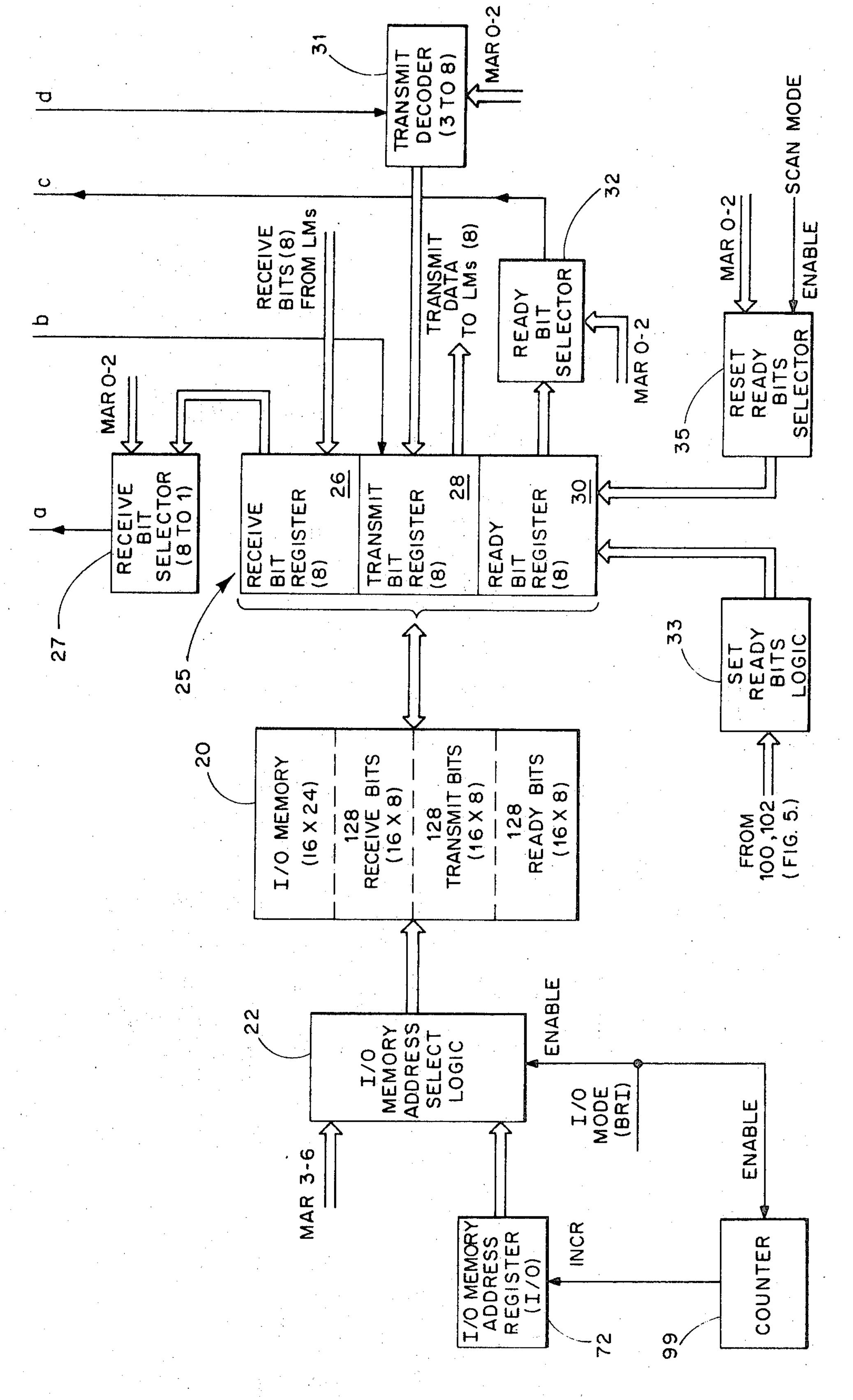
Figure 5:
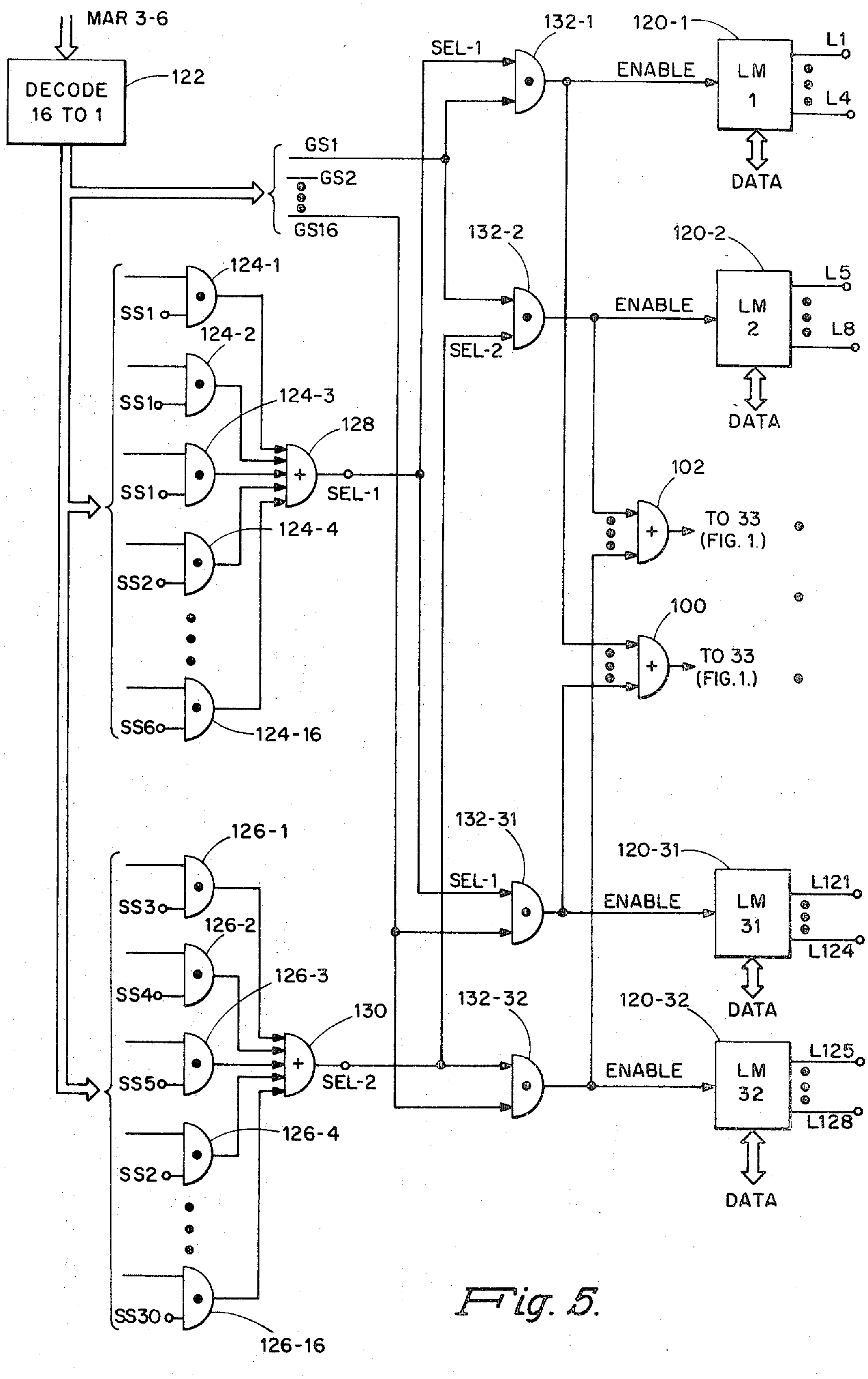
FIG. 5 is a block diagram illustrating the decode circuitry for selecting the respective communication lines in accordance with the principles of the present invention.

Now referring to FIGS. 1A and 1B, there is shown a main memory 14 and an input-output memory 20 connected for transfer of information therebetween and respectively coupled to a data processor (CPU) 9 and communication lines shown in FIG. 5. By way of example, the memories are configured as follows. The memory 14 is configured to include 256 word locations, each word including 18 bits. Of the 256 words, 128 are control words and 128 are data words. The number 128 directly relates to the number of communication lines to be serviced. In this case there are 128 communication lines. Each of the control words includes bits to indicate the current bit of a character being received, bits to indicate the current bit of a character being transmitted, bits to indicate the sample point of a bit being received, bits to indicate the sample point of bits being transmitted, and bits to indicate whether the communication lines are active or inactive. These various bits will be shown to be coupled with the various counters of register 18. Each of the data words includes two characters respectively comprising bits to indicate data bits of a character being transmitted and bits to indicate data bits of a character being received.

The I/O memory 20 is shown to include 16 word storage locations of 24 bits each. This arrangement is divided into three segments of 128 receive bits, 128 transmit bits and 128 ready bits. Each of these segments is shown to be in a 16 by 8 arrangement thereby making up the entire 16 by 24 arrangement of memory 20. One bit in each of the three segments is reserved for each communication line. The ready bits are set if the particular communication line has been addressed for transfer of information, the transmit bit segment is coupled to receive bits from memory 14 and to transfer bits to the communication lines and the receive bits segment is coupled to receive bits from the communication lines and is coupled for transfer of the bits to main memory 14. The organization of memory 20 allows eight communication lines to transfer bits with memory 20 simultaneously.

Figure 3:
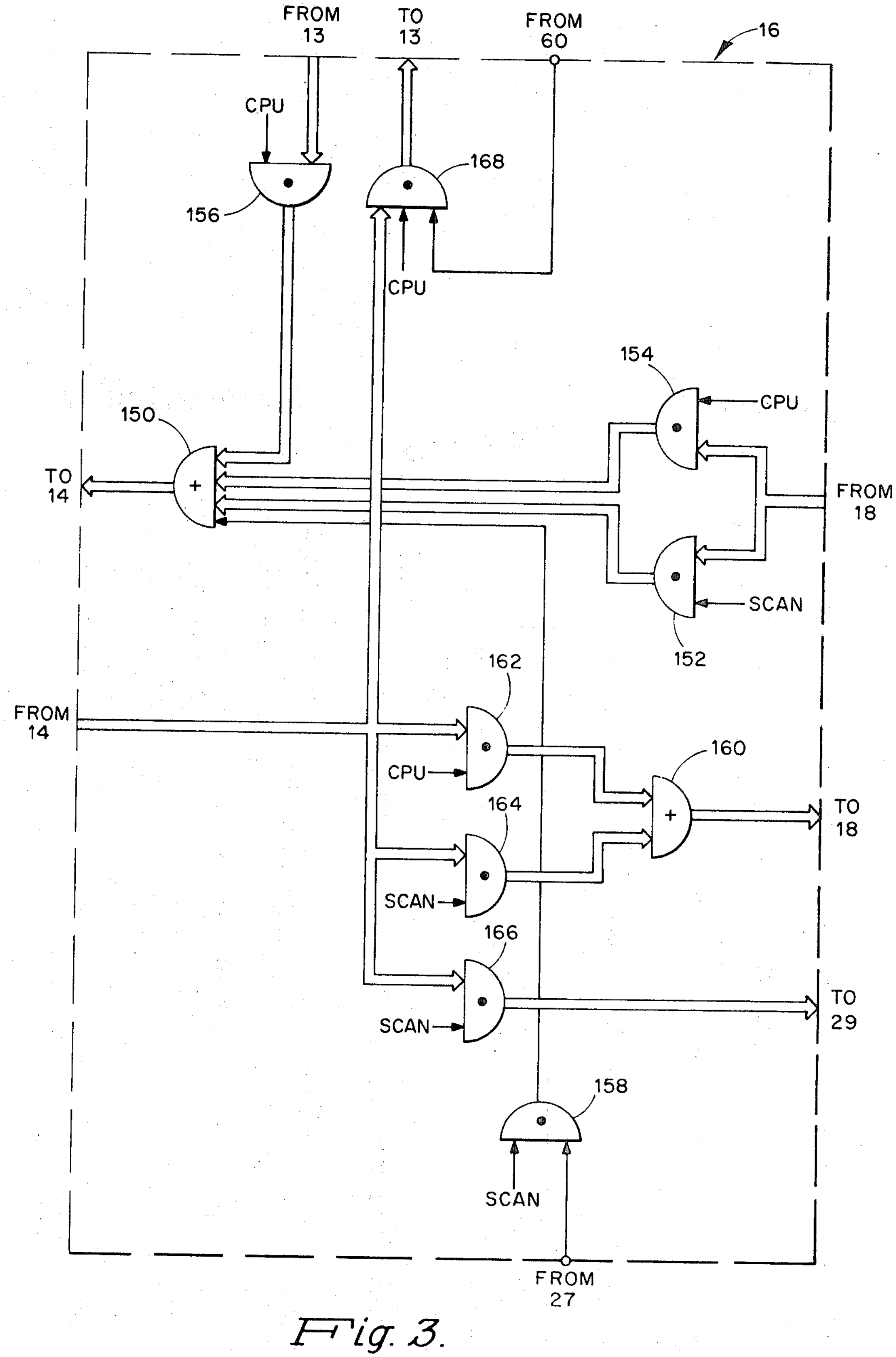
FIG. 3 is a block diagram illustrating the read/write-data/control select logic of the apparatus of the present invention.

Read/Write-Data/Control select logic 16 which is shown in detail in FIG. 3 is coupled to transfer control words between main memory 14 and register 18. Register 18 includes a receive state counter 40, a receive sample counter 36, a transmit state counter 42, a transmit sample counter 38 and a line active indicator 70. Receive sample counter 36 is coupled so that in the asynchronous communication mode it may be incremented once a start bit of a character is received and if the line addressed is ready for transfer of information. The bit interval is divided for example into seven sub-bit intervals. Accordingly, counter 36, after the start bit is received, is incremented such that upon the count of three, the middle of the bit interval is detected and the received bit is sampled at that time. The receive state counter 40 is coupled to be incremented each time a bit is sampled by counter 36, i.e. each time sample counter 36 equals a count of 3.

Upon transmission, the operation of the counters 38 and 42 is different since the distortion of the bit is not a prime factor as it was during the receive mode. Each time the processor 9 transmits a character to memory 14, the control word receives bit so that the transmit sample counter 38 is jammed to indicate the sixth bit. Thus, every time the counter 38 equals 6, this means that a bit will have to be transferred from memory 14 to memory 20 at the next opportunity. The counter 38 is coupled to the counter 42 to thereby increment counter 42 each time a bit is transmitted to memory 20. This is detected by the fact that the transmit sample counter 38 increments when the bit is transferred to memory 20 which thereby resets the counter 38 to zero which is the next indication after the count of 6. This indicates that the state counter 42 must be incremented.

The line active indicator 70 is controlled by the line control address register (LC) 8 and indicates a logical 1 if the addressed line is to be transmitting and/or receiving.

Input/output memory 20 is coupled for transfer of bits with a register 25 which includes a receive bit register 26, a transmit bit register 28 and a ready bit register 30. By way of example, the apparatus for the present invention has been organized such that the system may communicate with eight communication lines at a time. Thus, with the ready bits set for a particular communication line, the registers 26 and 28 will be able to receive bits from each of eight different communication lines and/or transmit bits to each of eight different communication lines via the registers 26 and 28 respectively.

The apparatus of the present invention is capable of operating in three modes of operation in an interlaced fashion. The first mode (CPU mode) is that mode in which characters are either transferred from processor 9 to memory 14 and/or transferred from memory 14 to processor 9. The second mode of operation (Scan mode) is that mode in which bits of characters are transferred between main memory 14 and I/O memory 20. An alternate mode of the first mode (CPU mode) is the LC mode during which time the line active indicator 70 is coupled to indicate whether the communication line is to be active or inactive. A third mode (I/O mode) of operation is that mode in which information is transferred between the I/O memory 20 and the communication lines. The modes of operation are timed as follows. The CPU mode and the LC mode vie for cycles; that is, if the CPU mode was active during the last sequence, then during the next sequence the LC mode will be active in a so-called toggling arrangement. Except during the start up of the system, the CPU mode will be the active mode in most cases unless a line is made inactive or active at a later time. Thus, the basic operating modes of the apparatus of the invention include a CPU mode, a Scan mode and an I/O mode. Each of the modes is interlaced with the others to operate during a fraction of a bit interval. A bit interval is that time during which a bit is transmitted or received with the communication lines. For example with a maximum baud rate of 300 bits per second, then one bit interval is equal to 3.33 milliseconds. A fraction of a bit interval has been picked to be one-seventh of a bit interval which is equal to 476 microseconds. These numbers will be used by way of illustration in the following description. The fraction of a bit interval, that is one-seventh of a bit interval, will be hereinafter referred to as a sub-bit interval. Within each of the sub-bit intervals are even smaller intervals which will be called cycles and which for purposes of illustration may occur for a duration of 1.6 microseconds. During a first cycle and during a second cycle, the Scan mode is allowed to function. During a sequential third cycle, the CPU mode is allowed to function. The I/O mode is allowed to operate in response to a baud rate interrupt which is enabled at a rate determined by the transmission rates of the various communication lines, that is, a baud rate interrupt (BRI) will repeatedly occur in a system where the transmission rate of a communication line is 300 baud at a rate of once every 476 microseconds which corresponds to once every sub-bit interval. If there are other transmission rates on the other lines, then the BRI signal will occur at a rate dependent thereon. The I/O mode has priority over both the CPU mode and the Scan mode. That is, if a CPU or Scan mode is in operation, the I/O mode will take priority upon completion of either of the CPU or Scan modes.

Thus, without a baud rate interrupt and therefore without an I/O mode operation, the sequence of operation would be Scan mode, Scan mode, CPU mode, Scan mode, Scan mode, CPU Mode, etc. With a BRI and thus with an I/O mode, the operation would be interrupted such that the I/O mode would be in operation for that length of time as it takes to service each of the bits of the I/O memory 20. In the example illustrated the I/O mode would take 16 cycles since eight communication lines are serviced for each cycle. Therefore the operation would be as follows, if for example the baud rate interrupt occurred during the second Scan mode cycle: Scan mode, Scan mode, I/O mode, CPU mode, Scan mode, Scan mode CPU mode, etc. Because of the unique configuration of the apparatus of the present invention, it will be seen that the CPU mode may be active when the I/O mode takes priority. Thus during I/O mode, only the Scan mode will be inhibited. This allows for greater throughput with the processor 9 as will be more particularly seen.

The operation of the apparatus of the invention will now be discussed. As stated hereinbefore, each of the modes takes place in one cycle, except the I/O mode which takes place in 16 cycles. Each of the operations of each mode during a cycle takes place during a subcycle time. For example, the cycle may be segmented into 16 equal parts of 100 nanoseconds each. Each of these subsegments is designated a phase such as $\phi 0$–$\phi 15$. In the following description therefore, it is anticipated that an operation takes place within the cycle at a particular phase. The particular phase, for purposes of explanation is not significant since the sequence of operation is the more significant aspect. Therefore, the phase at which a particular operation occurs will not be particularly stated.

During the first mode, or CPU mode, an address is transferred from data processor 9 to main memory 14 via register 11 and select logic 12. At this point it should be noted that registers 11, 10 and 8 are in addition to being reset, that is, in addition to being able to receive information directly from CPU 9, are also capable of being incremented, and accordingly include functions attributable to well known counters. The addressed location of main memory 14 includes a control word which is transferred to register 18 via logic 16. Receive state counter 40 is checked by means of complete character detector 60 in order to determine whether a full character is ready for a transfer from memory 14 to processor 9, and at the same time transmit state counter 42 is checked via detector 62 to determine whether or not a character should be transmitted from processor 9 to memory 14. If both detectors 60 and 62 do not indicate that a character is required for transfer, then the control word in register 18 is restored in memory 14 via logic 16 after which register 11 is incremented and the cycle ends. If detector 60 indicates that a character is to be transferred from memory 14 to processor 9, then a data input transfer request is sent to and received by the processor 9. At essentially the same time if detector 62 indicates that a character is to be transmitted from processor 9 to memory 14, a data output transfer request is coupled to and received by processor 9. If both detectors 60 and 62 indicate that a transfer must take place, the data input transfer request is acted upon first. However, no action will take place until the processor 9 is ready to accept the request. This may not happen for several cycles and possibly not for several sub-bit intervals, in which case the CPU mode remains static, i.e. the address in register 11 remains the same, until the processor 9 accepts the request. Even though the processor 9 does not accept the input transfer request, the data character is transferred from memory 14 to register 13 via logic 16. Thus, while the CPU mode is static, the address in register 11 does not change, since no advantage would be gained in trying to transfer information from other addresses, since the processor 9 controls and must be ready to accept requests. When the processor 9 accepts the input transfer request, data register 13 is enabled so that the character which was previously transferred to register 13 from memory 14 is accordingly transferred to processor 9. On the next cycle of the CPU mode the character is transferred from register 13 to processor 9 if the processor did not accept the character during the last cycle and if the processor 9 is ready to accept such character. If the character was previously transferred from register 13 to processor 9 then during this next cycle a character is transferred from processor 9 to register 13 if there was a CPU data output transfer request and if the processor 9 accepted such request. If the processor 9 did not accept the request then the attempt to service such requests would occur during the next cycle of the CPU mode. When the processor 9 does accept the data output transfer request, then the character is transferred from processor 9 to register 13 and to main memory 14 via select logic 16. After the transmit and receive characters are serviced for the communication line addressed by register 11, then register 11 is incremented to the next address. This completes the CPU mode for a selected address.

During the second mode or Scan mode, processor 9 transfers an address to line scan address register 10 which in turn addresses main memory 14 via logic 12 such that the control word for the line addressed is sent to register 18 via select logic 16. Simultaneously with the transfer from processor 9 to register 18, register 10 addresses I/O memory 20 via logic 12 and logic 22. I/O memory address select logic 22 is basically an OR gate which couples the MAR 3–6 address lines to logic 22 in the absence of an I/O mode enable command. Address lines MAR 3–6 are coupled from the address lines from select logic 12 indicated as MAR 0–7. It will be seen that the address bits MAR 3–6 are capable of addressing 16 locations in I/O memory 20, and it will be seen that address bits MAR 0–2 are coupled to address and/or enable any one of eight communication lines. Address bits MAR 3–6 actually select three groups of eight bits in I/O memory 20. As noted hereinbefore the memory 20 includes three segments. One for receive bits, another for transmit bits and another for ready bits. Each of such segments is organized in a 16 by eight matrix such that an address from MAR 3–6 addresses one of 16 by eight bits in the receive bit segment, one of 16 by eight bits in the transmit bit segment and one of 16 by eight bits in the ready bit segment. The eight bits in each of the segments correspond respectively to the same communication lines; whereas each of the bits in the groups of eight bits correspond to different communication lines. Thus it will be seen that eight communication lines are serviced at a time in the I/O mode and during the presently discussed Scan mode it will be seen that one of such eight bits of the different communication lines are serviced dependent upon the address indicated from register 10 and indicated by address bits MAR 0–2.

Thus simultaneously with the control word being transferred to register 18, register 10 addresses memory 20 such that eight receive bits, eight transmit bits and eight ready bits are transferred from memory 20 to registers 26, 28 and 30 respectively of register 25. Continuing with the Scan mode and during the same cycle, bit 7 of register 10 is set so that the data word in memory 14 will be addressed. Next, the eight ready bits are transferred from register 30 to ready bit selector 32 and the ready bit to be gated from selector 32 is coupled to counters 36 and 38 as enabled by the address bits MAR 0–2. If the ready bit is set for the line addressed, that is the ready bit enabled via selector 32, then counters 36 and 38 will be incremented, the counter 36 not being incremented until a start bit is received by AND gate for the asynchronous mode of transmission. If the ready bit is not set for the communication line addressed, then neither counter 36 nor counter 38 will be incremented. The fact that counters 36 and 38 are incremented indicates that a sub-bit interval, i.e. one-seventh of a bit interval, has elapsed for the particular communication line addressed. The significance of this is appreciated for the receive sample counter 36 whereby it will indicate the center of a bit received when it has been incremented to indicate a count of 3. It is at this point that the received bit is sampled. That is, it is at this point that the received bit is transferred from memory 20 to memory 14. At this point in time when the receive sample counter indicates a count of 3, counter 36 increments receive state counter 40. As stated hereinbefore, the receive state counter 40 indicates the bit location in the character of the bit just received. Counter 40 is checked for a complete character by detector 60 and the bit just sampled is written into memory 14 as enabled by the write enable logic 43 which is a decoder selecting the one of eight possible bits of a character. Actually, each time a bit is received it is presented from memory 20 to memory 14 regardless of the number indicated by receive sample counter 36. That is, even though the received bit is not sampled at the mid-point and may be erroneous, it is presented from memory 20 to memory 14 for each increment of the sample counter 36. However, when the sample counter 36 indicates the mid-point of a bit, then the theoretically correct bit is actually written from memory 20 into memory 14, counter 40 is incremented by a counter 36 and therefore the bit just received by memory 14 cannot be overwritten by the next received bit which next received bit is written into the next bit location of the character addressed for memory 14. Alternatively, each of the samples, regardless of whether they are a sample of the mid-point of the bit, may have been written into memory 14 so long as the bit sample corresponding to the mid-point of the bit is the last bit sample written for that address. Thus, the received bit is read into memory 14 from memory 20 via the receive bit register 26, the receive bit selector 27 which is coupled to transfer one of the eight bits as indicated by the address bits MAR 0–2 and via select logic 16.

For the transmit operation of the cycle, and as stated hereinbefore, the transmit sample counter 38 is or has been loaded with a count of 6 which indicates that on the next increment of counter 38 a bit will be transferred from memory 14 to memory 20. The sampling as provided in the receive mode is not required in the transmit mode because of the substantially lesser amount of distortion for the bits being transmitted. Thus, when the ready bit is set for the line addressed, the sample counter 38 is incremented thereby incrementing the transmit state counter 42 whose output is checked by detector 62 for the CPU mode as discussed hereinbefore and whose output is coupled to enable transmit selector 29 to send one bit of the character to be transmitted from memory 14 via logic 16 to transmit bit register 28 as enabled by transmit decoder 31. Transmit decoder 31 is enabled by the address bits MAR 0–2 indicating which of the eight bits is to be strobed into the register 28 and decoder 31 is further enabled by the sample counter 38 indicating that a character is ready for transmission. The transmit sample counter 38 is again loaded with a count of 6 to indicate that further bits of a character are to be transmitted until such time as each of the bits of these characters has been transmitted.

Continuing with the transmit operation of the Scan mode, after the data is strobed from selector 29 to register 28 via decoder 31, the addressed communication line ready bit is reset in register 30 via reset ready bits selector 35. Bit 7 in the line scan address register 10 which was previously set after the control word was passed to register 18 so that the data word was capable of being transferred from memory 14, is reset so that the contents of register 18 may be restored as updated into memory 14 via logic 16. At the same time that the contents of register 18 are restored in memory 14, the contents of register 25 are stored in memory 20. At the end of this Scan mode cycle, register 10 is incremented to the next address. This completes one full timing interval or cycle of the Scan mode. As stated hereinbefore the Scan mode is repeated one more time after which the CPU mode takes command. As also stated hereinbefore, the Scan mode gives up priority to the I/O mode in the event of a baud rate interrupt as will be presently discussed.

Figure 4:
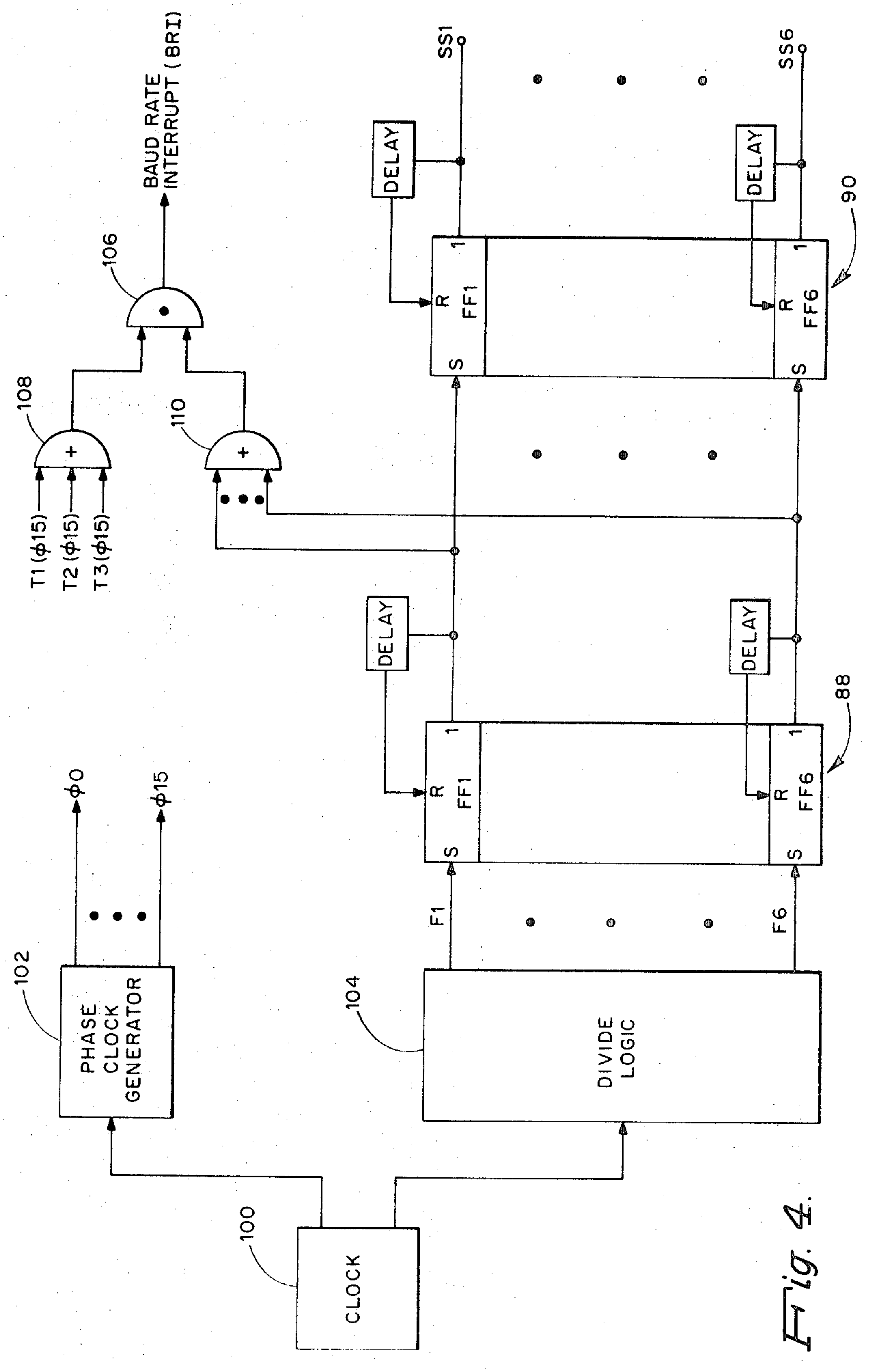
FIG. 4 is a block diagram illustrating logic for generating the timing signals and the baud rate interrupt signal of the apparatus of the present invention.

Now referring to FIG. 4, there is illustrated a clock 100 coupled to provide clock pulses to phase clock generator 102. Generator 102 provides for purposes of illustration 16 sub-clock or sub-cycle signals all of which appear within one clock time. As stated hereinbefore by example, if the time interval or cycle of each clock pulse is 1.6 microseconds, then each sub-clock period such as phase 0, — phase 15 is equal to 100 nanoseconds. Each of these sub-clock signals are utilized to control the operations as hereinbefore discussed for the CPU mode and Scan mode and as hereinafter discussed for the I/O mode and LC mode. Block 100 is also coupled to provide clock signals to divide logic 104. Divide logic 104 is coupled to provide any one of 6 different frequency outputs F1 through F6. More or less frequency outputs may be provided by divide logic 104 dependent upon the various transmission rate of the communication lines coupled to the apparatus of the present invention. For example, if the number of different transmission rates for the communication lines is equal to 2 then only two frequencies need be provided by divide logic 104. For purposes of illustration, the apparatus of the present invention is provided to service six different transmission rates and therefore six different frequencies are provided by divide logic 104.

The baud rate interrupt (BRI) is provided at a rate determined by the frequency of the divide logic 104 outputs. The baud rate interrupt is provided by AND gate 106 which has one input from OR gate 108. Three inputs are provided to gate 108, which are represented as signals T1, T2 and T3. These signals will be further explained with reference to FIG. 2. These signals are generated at the end of a cycle, for example, of the CPU mode or Scan mode at phase 15 as generated by phase clock generator 102. Times T1 and T2 are the times that the Scan mode is in operation and T3 is the time during which the CPU mode is in operation. In this way gate 106 cannot be enabled until the end of a cycle for either of these modes in order that the mode is allowed to continue to completion. The other input to gate 106 is provided by OR gate 110 whose inputs are coupled to six flip-flops of register 88. The flip-flops 88 are set when the signal from divide logic 104 is present, thereby generating the baud rate interrupt at the end of the present mode cycle. A flip-flop is reset by means of a one cycle delay from the output of the flip-flop to the reset input thereof or by means of the phase clock generator such that the baud rate interrupt has had sufficient time to be generated at the end of the mode cycle. The output of the flip-flops of register 88 are coupled directly to set the respective flip-flops of register 90, thereby generating signals SS1 through SS6 respectively. The flip-flops of register 90 are also reset at the termination of a mode cycle time. The outputs SS1 through SS6 are coupled to the decode circuitry of FIG. 5 as will now be discussed.

Now referring to FIG. 5, there is shown decode circuitry for selecting one of the plurality of communication lines dependent upon the address from the particular one of registers 10 or 11 and dependent upon the communication line which corresponds in transmission rate to the frequency of the baud rate interrupt. For exemplary purposes, there are considered to be 128 communication lines serviced by the apparatus of the present invention. Groups of four communication lines are each serviced by a line module. Thus there are 32 line modules. Each line module is of conventional design and each line module may include for each communication line a line interface receiver, amplifier and a gate which is coupled for enabling, and a line interface driver amplifier for transmission coupled at its output to a communication line and at its input to a gate or flip-flop buffer which is enabled by gating or clocking respectively. The line modules are shown in FIG. 5 as devices 120-1 through 120-32. Each of the line modules is coupled to be enabled as previously indicated and each line module includes bi-directional data transfer paths also as shown on FIG. 5. A decode circuit 122 is coupled to receive address bits MAR 3–6 from the output of selection logic 12 so as to present one of 16 signals to one of the inputs of one of the AND gates 124-1 through 124-16 and to one of the inputs of one of the AND gates 126-1 through 126-16. The other input to each of gates 124 and 126 are coupled to receive any one of the signals SS1 through SS6 as generated by the apparatus of FIG. 4. The output of each gate 124 is coupled to OR gate 128 to produce a SEL-1 signal and the outputs of each gate 126 are coupled to the inputs of OR gate 130 to produce an SEL-2 signal, these signals being generated when any one of the associated gates 124 and 126 are enabled. Thus, if the decode logic 122 decodes the address bits MAR 3–6 so that a signal is present at one of the inputs of gates 124-1 and 126-1, and if the SS1 signal is generated, then only gate 124-1 will be enabled thereby producing the SEL-1 signal. If the decode circuit 122 selects gates 124-4 and 126-4 and if the SS2 signal is present then both signals SEL-1 and SEL-2 will be generated.

The decode circuit 122 also produces signals GS1 through GS16 each of which are coupled to pairs of AND gates 132 associated with pairs of line modules 120. Thus, if the GS1 signal is generated, then gates 132-1 and 132-2 will be partially enabled. The other inputs of the pairs of gates 132 are coupled to receive the SEL-1 signal and the SEL-2 signal. That is, both gates 132-1 and 132-2 receive the GS1 signal, gate 132-1 receives the SEL-1 signal and gate 132-2 receives the SEL-2 signal. The same is true for all the other pairs of gates including gates 132-31 and 132-32 which are associated together and with line modules 120-31 and 120-32 respectively. Gates 132-31 and 132-32 each receive as one input thereof signal GS16 from decode circuit 122, whereas gate 132-31 receives the SEL-1 signal and whereas gate 132-32 receives the SEL-2 signal as the other inputs. Thus, for example, if the GS1 signal is generated then gate 132-1 and gate 132-2 are partially enabled. If only the SEL-1 signal is generated via gate 128 then only line module 120-1 will be enabled. Line module 120-2 is enabled if only the SEL-2 signal is generated. If both signals SEL-1 and SEL-2 are generated as previously discussed, then both line modules 120-1 and 120-2 in this example are enabled.

Enabling of the line modules allows the data to flow into and out of the line modules. The data paths of the pairs of line modules such as 120-1 and 120-2 are ORed together for coupling to register 25 and more particularly register 26 for the receive lines and register 28 for the transmit lines (FIG. 1). The other pairs of the other line modules have their data paths also ORed together and the two data paths of each pair of line modules are further ORed together with the two data paths of the other line modules. When any one of the odd numbered line modules such as 120-1 or 120-31 is enabled, a signal is sent via OR gate 102 to set ready bits logic 33 (FIG. 1) and similarly when any one of the even numbered line modules is enabled, then a signal is sent via OR gate 100 also to logic 33. Logic 33 may include buffer flip-flops and/or pulse shaping networks so that a signal is sent to set the bits in register 30 dependent upon which one of gates 100 or 102 produces a signal. Both of such gates may produce a signal thereby enabling all the ready bits (eight total) in register 30. The logic 33 is coupled to thus set four ready bits if only one of the signals is received from gate 100 or gate 102 and to set eight ready bits if both signals are received from gates 100 and 102. Thus it has been seen that the decode circuitry of FIG. 5 is utilized to enable the groups of communication lines via the line modules dependent upon the communication line addressed by the address bits MAR 3–6 and dependent upon the transmission rate of the respective communication lines. It can also be seen that the SS1–SS6 connections to gates 124 and 126 are configurable such that any selected arrangement of transmission rates may be coupled to enable the respective line modules. Thus if only one transmission rate is required for the system of the apparatus of the invention then that frequency corresponding to such transmission rate such as the signal SS1 may be coupled to each of the gates 124 and 126.

Having now discussed the means by which the baud rate interrupt (BRI) may be generated, the I/O mode will now be discussed with reference to FIGS. 1A and 1B. The BRI signal is coupled to enable the I/O memory address select logic 22. In this case therefore the I/O memory address register 72 is coupled by means of logic 22 to memory 20. The BRI signal also enables counter 99 which is set to increment register 72 16 times and then resets itself and disables. Register 72 thus addresses memory 20 a total of 16 times, thereby servicing the 128 bits for each of the three segments of memory 20 and this happens each time an I/O mode is entered. At this point, and for each increment interval of counter 99 (each increment interval having the duration of a cycle), the following operation takes place. Accordingly, the I/O mode operation takes 16 times the time as that for just the CPU or Scan modes. The contents of memory 20 are thus loaded into register 25 and the data is strobed from register 28 to the enabled line modules. Further, the enabled line modules transmit the receive bits to register 26 and at the same time the ready bits to register 30. After this bidirectional transfer of information, the contents of register 25 are written back into memory 20. The process of loading the contents of memory 20 into register 25, the bidirectional transfer of information and the rewriting of the updated contents of register 25 back into memory 20 continues until the counter 99 has incremented to address each of the 16 locations of memory 20. After this time the I/O mode is reset so that the Scan mode may continue. If another baud rate interrupt is present then that would take priority over the Scan mode.

The Read/Write-Data/Control select logic 16 may be implemented to transfer information between the various elements of the apparatus of the invention as more particularly shown in FIG. 3. The transfer of information to memory 14 from register 18 is processed by means of OR gate 150 which is coupled to receive inputs from AND gates 152 and 154 for the Scan mode and CPU mode respectively. The transfer of information from data register 13 to memory 14 is also by means of gate 150 and AND gate 156 during the CPU mode. The transfer of a bit from receive bit selector 27 during the Scan mode is enabled also by means of gate 150 and further AND gate 158. The transfer of information to register 18 from memory 14 is accomplished by means of OR gate 160 and by AND gates 162 and 164 for the CPU and Scan modes respectively. The transfer of information to transmit selector 29 from memory 14 is by means of AND gate 166 for the Scan mode. The transfer of information from memory 14 to register 13 is by means of AND gate 168 for the CPU mode as enabled by the signal from complete character select detector 60.

Figure 2:
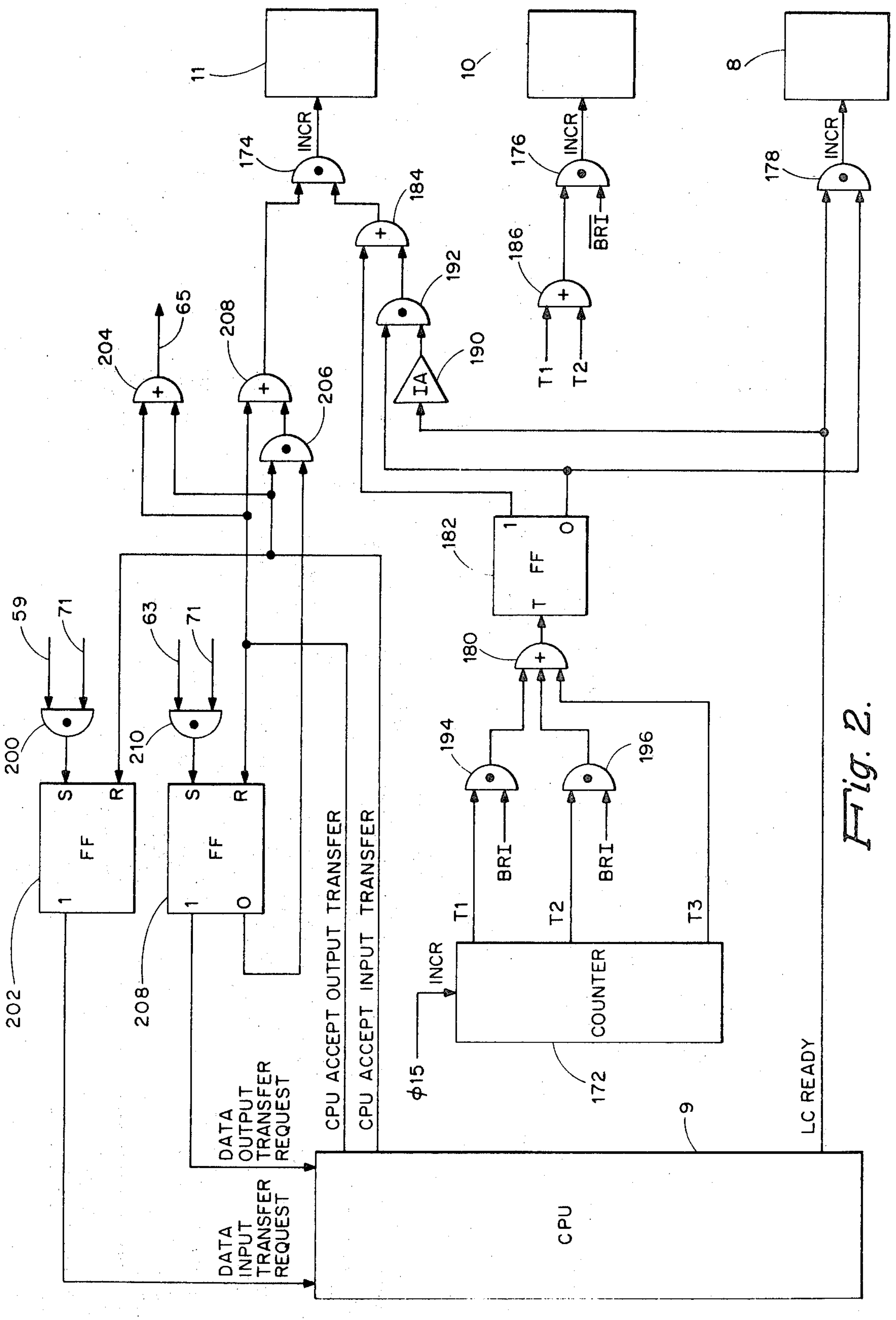
FIG. 2 is a block diagram illustrating the enabling logic used for the various modes of operation of the present invention.

Now referring to FIG. 2, the timing required to interlace the various modes of operation is more specifically shown as follows. As stated hereinbefore, the time for each mode cycle is divided into sub-clock intervals as indicated by phase 0 through phase 15. Each of the modes CPU and Scan are accomplished within the given time provided by sub-clocks phase 0 through phase 15. The last occurring sub-clock interval, that is phase 15, is coupled to increment a counter 172, which provides three outputs indicated as T1, T2 and T3. Each of the times T1 through T3 are present respectively during phase 0 through phase 15. During basic clock times T1 and T2, the Scan mode is in operation whereas during time T3 either the CPU mode or the LC mode is in operation. This is generally true unless the BRI signal is generated. Counter 172 therefore generates T1 and then is incremented to generate T2 at the next phase 15 sub-clock and is then incremented to generate T3, etc. After this, T1, etc. is again produced. Signals T1, T2 and T3 are coupled by the logic shown to increment registers 11, 10 and 8 of FIG. 1, by means of inputs from AND gates 174, 176 and 178 respectively.

Assuming the BRI signal is not present, the Scan mode of operation occurs during times T1 and T2 as hereinabove stated thereby enabling OR gate 186 during the occurrence of either one of said signals T1 and T2 and enabling AND gate 176 when the BRI signal is not present. This condition thereby increments the register 10 at the end of each clock interval or more particularly at the phase 15 sub-clock time. Thus during times T1 and T2, the Scan mode is in operation after which counter 172 produces the clock interval T3 to enable to signal via OR gate 180 to toggle flip-flop 182. Assuming that flip-flop 182 is in the reset state when the toggle signal is received, then the first signal generated from flip-flop 182 will be at one output thereof, thereby enabling a signal through OR gate 184 to AND gate 174. If the CPU 9 is ready to accept either an input or an output transfer, then it will be seen that AND gate 174 is fully enabled to increment register 11 at the phase 15 clock time of clock interval T3. Thus register 11 is now ready to address the next word in memory 14 at the next occurrence of clock interval T3. The next time signal T3 appears, flip-flop 182 will again be toggled so that the zero output thereof will include a signal thereon which together with the condition of the LC ready signal not present will via inverting amplifier 190 filly enable AND gate 192 thereby partially enabling AND gate 174 via OR gate 184. As before, the register 11 will be incremented if the CPU 9 has accepted an input or output transfer. If during time T3 the LC mode is enabled for operation so that the LC ready signal is present, then AND gate 178 is partially enabled by the LC ready signal and is fully enabled when the flip-flop 182 is toggled so that a signal appears at the zero output thereof. This then increments register 8 at the end of the clock interval, that is at phase 15, so that it is ready to address the next word in memory 14 to thereby activate or inactivate a line via the line active indicator 70 as shown in FIG. 1. This feature is especially useful in the initial start up mode where none of the lines includes an indicator thereof to indicate whether the line is active or inactive. Thus in this manner when a full scan of all the communication lines is brought about during the LC modes, the respective communication lines may be set in either the active or inactive state.

If a baud rate interrupt is present, then the register 10 cannot be incremented, and the Scan mode of operation is disabled. The BRI signal does however enable AND gates 194 and 196 when the T1 and T2 signals are generated respectively. The outputs of gates 194 and 196 are coupled via OR gate 180 to toggle flip-flop 182 so that a signal is present at either one of the inputs to gate 184 thereby presenting a signal to one input of AND gate 174. A signal is also presented at either one of the inputs of OR gate 184 when the time T3 is present. Thus during each of times T1, T2 and T3, the CPU mode is capable of operation. At this time the I/O mode is also in operation. That is, as the CPU 9 and memory 14 transfer characters therebetween, the memory 20 communicates with the respective communication lines.

The other input to AND gate 174 is enabled as follows. If detector 60 of FIG. 1 detects a complete character, then a signal is present at one input on line 59 of AND gate 200. The other input to AND gate 200 is coupled from the line active indicator 70 on line 71, and AND gate 200 is not fully enabled unless the line is active. This condition sets flip-flop 202 thereby presenting a data input transfer request to CPU 9. When the CPU accepts the input transfer and this may occur some period of time later, then the flip-flop 202 is reset and a signal is presented to one input of OR gate 204 thereby generating a signal on line 65 enabling data register 13 of FIG. 1. Also at this time, a signal is presented to one input of AND gate 206 whose other input is coupled to the zero output of flip-flop 208. Thus, AND gate 206 is not fully enabled until the word being addressed in memory 14 for the CPU mode is allowed to both input and output a character where both detectors 60 and 62 so indicate. If flip-flop 208 remains reset because there is no data output transfer request as indicated by detector 62, then gate 206 will be enabled and register 11 will be allowed to increment to the next address.

When the detector 62 of FIG. 1 indicates that a character is required from the CPU 9, and if the communication line is active, then AND gate 210 is fully enabled by inputs on lines 63 and 71 thereby setting flip-flop 208 and generating a data output transfer request. Once the CPU 9 accepts the output transfer request, the data register 13 is again enabled so that a character may be received from CPU 9 and further the flip-flop 208 is reset and a signal is presented via OR gate 208 to the other input of AND gate 174. At this point, register 11 is finally allowed to increment for the input/output request condition thereby allowing the CPU mode to continue at the next address.

Thus it has been seen that when the signals T1 and T2 are generated, and there is no BRI signal, the Scan mode is in operation such that at the end of each cycle thereof the register 11 is incremented. It also has been seen that at time T3, the CPU mode is operated in conjunction with the LC mode by means of an alternate timing arrangement, whereas if the LC mode does not require servicing, the CPU mode is enabled each time the signal T3 occurs. It has also been seen that should the BRI signal be generated, then the Scan mode is inhibited and the CPU mode is allowed to operate during the times T1, T2 and T3. Thus by utilizing this timing arrangement, a greater throughput between the processor 9 and memory 14 is ascertained, while simultaneously servicing the plurality of communication lines.

In further illustration of the operation of the present invention, the timing shall be described with reference to specific examples. If for example the maximum baud rate is 300 bits per second, then a full bit interval will be 3.33 milliseconds and one-seventh of a bit interval will be 476 microseconds. Thus the baud rate interrupt will occur at a maximum rate of once every 476 microseconds, that is, seven times per full bit interval. The baud rate interval will also include smaller periods depending upon the lower transmission rates. The apparatus of the present invention may also for example operate with a cycle time of 1.6 microseconds per operation. That is, the duration of the pulses T1, T2 and T3 is each 1.6 microseconds whereas the duration of each phase 0 through phase 15 would be 100 nanoseconds. In this arrangement therefore each cycle of the Scan mode will take 1.6 microseconds, each cycle of the CPU mode will take 1.6 microseconds, and each cycle of the LC mode will take 1.6 microseconds. The I/O mode will take 16 times the time required for the above modes so that the I/O mode will thus in response to a BRI signal take a total of 25.6 microseconds. During this 25.6 microseconds, 16 CPU mode cycles may occur. Thus, for 128 lines with the cycle time of 1.6 microseconds, it would take 204.8 microseconds to make a complete scan of all the communication lines. If there were six baud rate interrupts during one-seventh of a bit interval or during 476 microseconds, then the time required for six complete I/O mode scans would be 6 × 25.6 or 153.6 microseconds. Without the interlace feature and the parallel feature between the CPU mode and I/O mode, the available time for CPU mode transfers will be the sum of 358.4 microseconds (204.8 plus 153.6) subtracted from 476 microseconds or approximately 117 microseconds. Thus during the 117 microseconds at least 64 CPU mode cycles are allowed during one-seventh of a bit interval. However, with the interlace and parallel feature between the CPU and I/O modes, then during the 153.6 microseconds allocated to the six I/O memory Scan mode cycles, an additional amount of 96 cycles may be allocated to the CPU mode so that a total of 160 cycles is allocated therefor during one-seventh of a bit interval. This timing has been found to be sufficient even when the peak maximum data rate for the CPU transfers in the CPU mode is encountered, that is, when all transfer and receive characters mature at once.

It has thus been seen that the provision of multiple memory address registers coupled with a data processor and the multiplexor memories, in a predetermined interlace access arrangement, provides the apparatus of the invention with the capability to maximize memory access efficiency, averages the processor access time with the communication lines allowing the processor an average rather than a fixed maximum access time per line, and further allows independent modes of operation without the necessity of complex logic in order to remember the address last accessed when returning to each mode of operation. The times allowed for each mode are allocated so as to guarantee the necessary number of Scan modes to examine the communication lines within a fraction (1/7) of a bit interval, with the remaining time used for I/O mode and CPU mode or the LC mode.

When the I/O mode is enabled, the Scan mode is inhibited, allowing the main memory to be coupled with the CPU or LC mode for this duration. This increases system efficiency by permitting the transfer of information for lines requiring processor access when the main memory would otherwise be idle and by satisfying processor requests that would otherwise reduce the average processor response time for those lines yet to request processor access. This interrelationship of modes and associated address registers provides the processor with a flexible response capability to respond to each processor request within a predetermined period which in accordance with the above specific example has been calculated to be 6.67 milliseconds. Thus, for the worst case, as long as the average processor response does not exceed 22 microseconds, it has been calculated that no loss of information or reduction of information transmission rate will result.

The independence of each mode and associated address registers provides the system with the ability to remember the last line operated on, in each mode, so that no line misses a required operation. Furthermore, the temporary storage and interchange of this information is not required as it is already contained in its associated mode address register. The address register used during the CPU mode also doubles as a processor storage buffer to identify the line requiring a processor access, so as not to require a special buffer to satisfy this requirement. By subdividing the apparatus operation into modes, and modes into a fixed time relationship for a fraction of a bit interval, the overall system logic is simplified and worst case specifications can be assigned while reducing the probability that the worse case situations will arise.

While specific forms of the invention have been described for purposes of illustration, it is contemplated that numerous changes may be made without departing from the spirit of the invention.

What is claimed is:

1. The combination comprising:
A. storage means for storing bits of information;
B. first means for coupling said storage means for parallel transfer of a plurality of said bits with a data processor;
C. second means for coupling said storage means for serial transfer of said bits with a plurality of communication lines;
D. said storage means comprising:
1. first means for assembling said bits in series, and
2. second means for assembling groups of said bits; and
E. control means responsive to an interrupt signal, said control means comprising:
1. means for disabling said first and second means for assembling in order to inhibit further assembly of said bits,
2. means for enabling said second means for coupling in order to serially transfer the previously assembled ones of said bits, and
3. means for enabling said first means for coupling in order to transfer in parallel the previously assembled groups of said bits.

2. The combination comprising:
A. a plurality of communication lines;
B. a first memory;
C. a second memory;
D. a data processor;
E. first means for selectively coupling said plurality of communication lines to said first memory during a first mode of operation;
F. second means for selectively coupling said first memory to said second memory during a second mode of operation;
G. third means for selectively coupling said second memory to said data processor during a third mode of operation;
H. timing means for enabling said second and third coupling means in a predetermined sequence;
I. means for generating an interrupt signal; and
J. control means responsive to said interrupt signal, said control means comprising:
1. means for enabling said first coupling means;
2. means for disabling said second coupling means; and
3. means for enabling said third coupling means when said second coupling means is disabled so that said third coupling means is enabled during the time provided for said second mode of operation.

3. The combination of claim 2 wherein:
A. said second memory comprises a plurality of word storage locations at least equal in number to the number of said communication lines, each of said word storage locations comprising a receive character location and a transmit character location, each of said characters comprising a plurality of bits; and
B. said first memory comprises a plurality of receive bit storage locations equal in number to the number of said communication lines and a plurality of transmit bit storage locations equal in number to the number of said communication lines.

4. The combination of claim 3 further comprising:
A. means for addressing each of said receive bit and transmit bit storage locations each time said interrupt signal is generated; and
B. means for transferring bits with those communication lines which are ready for such transfer.

5. The combination of claim 4 wherein:
A. certain ones of said communication lines are coupled for transfer of bits at different transmission rates;
B. said interrupt signal is generated at frequencies corresponding to said different transmission rates; and
C. said communication lines which are ready for such transfer correspond at least to those lines whose transmission rate corresponds to the frequency of said interrupt signal which resulted in the enabling of said first coupling means.

6. The combination of claim 2 further comprising:
A. first means for indicating that said third mode of operation is inactive during said predetermined sequence;
B. second means for indicating that said interrupt signal is inactive; and
C. means responsive to said first and second means for indicating, for enabling said second mode of operation during the time provided for said third mode of operation by said timing means.

7. Multiplexing apparatus comprising:
A. a data processor;
B. a plurality of communication lines;
C. a first memory;
D. a second memory;
E. a first register for addressing said second memory during a first cycle of operation of said apparatus during which information is transferred between said data processor and said second memory;
F. a second register for addressing said second memory and said first memory during a second cycle of operation of said apparatus during which information is transferred between said first memory and said second memory;
G. means for selectively enabling said first cycle and said second cycle;
H. means for generating an interrupt signal; and
I. control means included in said means for selectively enabling and responsive to said interrupt signal, said control means comprising:
1. means for inhibiting the operation provided during said second cycle,
2. means for enabling during said second cycle the operation provided during said first cycle; and
3. means for selectively coupling said plurality of communication lines to said first memory.

8. The apparatus of claim 7 further comprising:
A. first means for indicating that said processor is not ready to transfer information during said first cycle of operation;
B. second means for indicating that said interrupt signal is inactive, and
C. means responsive to said first and second means for indicating, for enabling during said first cycle the operation provided during said second cycle.

9. Multiplexing apparatus comprising a main memory, an input/output memory, means for coupling said main memory with a data processor in order to transfer information therebetween, means for coupling said input/output memory with a plurality of communication lines in order to transfer information therebetween, means for coupling said main memory and said input/output memory for transfer of information therebetween, wherein said coupling is provided in order to assemble information into a form acceptable by said processor during the receipt of information from said communication lines and wherein said coupling is provided in order to disassemble information into a form acceptable by said communication lines during the transmission of information from said processor, and wherein the improvement comprises:

A. first means for selectively enabling during a predetermined time period
   1. a first transfer of information between said main memory and said data processor, and
   2. a second transfer of information between said main memory and said input/output memory;

B. means for generating an interrupt signal; and

C. second means, responsive to said interrupt signal, for selectively enabling during said predetermined time period
   1. a third transfer of information between said main memory and said data processor, and
   2. a fourth transfer of information between said input/output memory and some of said plurality of communication lines.

10. The apparatus of claim 9 wherein said predetermined time period includes at least two portions and wherein in response to said first means for enabling said first transfer takes place during a first portion of said predetermined time period and said second transfer takes place during a second portion of said predetermined time period and wherein in response to said second means for enabling, both said third transfer and said fourth transfer take place simultaneously during both said first and second portions.

11. The apparatus of claim 9 wherein said improvement further comprises:

A. first means for detecting that said processor is not transferring information with said main memory in response to said first means for enabling;

B. second means for detecting that said second means for enabling is not responding to said interrupt signal; and C. third means, responsive to said first and second means for detecting, for selectively enabling during said predetermined time period a fifth transfer of information between said main memory and said input/output memory.

12. The apparatus of claim 11 wherein in response to said third means for enabling said fifth transfer takes place during both said first and second portions.

13. The apparatus of claim 11 wherein said predetermined time period includes first, second and third portions and wherein in response to said first means for enabling, said second transfer occurs during said first and second portions and said first transfer occurs during said third portion; and wherein in response to said second means for enabling, both said third and fourth transfers occur simultaneously during each of said first, second and third portions; and wherein in response to said third means for enabling, said fifth transfer occurs during each of said first, second and third portions.

* * * * *